United States Patent
McGuffin et al.

(10) Patent No.: US 8,755,952 B2
(45) Date of Patent: Jun. 17, 2014

(54) AUTOMATIC PRESENTATION OF A "WHEN CAN WE . . . " MESSAGE COMPOSITION SCREEN RESPONSIVE TO A NEGATIVE RESPONSE MESSAGE

(75) Inventors: Thomas F. McGuffin, Bellevue, WA (US); Thomas D. Judd, Woodinville, WA (US); Reetu Gupta, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 816 days.

(21) Appl. No.: 12/893,317

(22) Filed: Sep. 29, 2010

(65) Prior Publication Data

US 2012/0079398 A1 Mar. 29, 2012

(51) Int. Cl.
- *G01C 23/00* (2006.01)
- *G05D 3/00* (2006.01)
- *G06F 7/00* (2006.01)
- *G06F 17/00* (2006.01)

(52) U.S. Cl.
USPC ............................................................ 701/3

(58) Field of Classification Search
USPC ............................................................ 701/3
See application file for complete search history.

(56) References Cited

U.S. PATENT DOCUMENTS

| | | | |
|---|---|---|---|
| 6,313,759 B1 | 11/2001 | Musland-Sipper | |
| 2004/0124998 A1 | 7/2004 | Dame | |
| 2008/0163093 A1* | 7/2008 | Lorido | 715/771 |
| 2008/0167885 A1 | 7/2008 | Judd et al. | |
| 2008/0288164 A1* | 11/2008 | Lewis et al. | 701/120 |
| 2010/0030467 A1* | 2/2010 | Wise et al. | 701/204 |
| 2010/0188266 A1* | 7/2010 | Judd et al. | 340/945 |
| 2010/0286900 A1* | 11/2010 | Depape et al. | 701/120 |

\* cited by examiner

*Primary Examiner* — Khoi Tran
*Assistant Examiner* — Harry Oh
(74) *Attorney, Agent, or Firm* — Fogg & Powers LLC

(57) ABSTRACT

A system to reduce head-down time for a flight crew member is provided. The system includes a functional module that includes a set of screens used to receive and send controller pilot data link communications (CPDLC) messages between an aircraft and a ground-based system; a message composition screen communicatively coupled to the functional module; and a shortcut interface communicatively coupled to the functional module, wherein a shortcut prompt is displayed when one of a response timer expires or a negative uplink response message is received responsive to a previously-sent downlink request message, wherein an implementation of the shortcut interface generates a "when can we expect . . . " message related to the previously-sent downlink request message.

20 Claims, 4 Drawing Sheets

AUTOMATIC PRESENTATION OF A "WHEN CAN WE . . . " MESSAGE COMPOSITION SCREEN RESPONSIVE TO A NEGATIVE RESPONSE MESSAGE

GOVERNMENT LICENSE RIGHTS

The invention was made with Government support under Contract No. DTFAWA-10-A-80003 awarded by the Federal Aviation Administration. The Government has certain rights in the invention.

BACKGROUND

A controller pilot data link communications (CPDLC) human machine interface (HMI) is a set of screens used by members of an aircraft flight crew to receive uplink messages from the air traffic controller and to send downlink messages to the air traffic controller. Today when a pilot of an aircraft wants to change altitude or speed, the pilot talks to the air traffic controller (ATC), typically, via a very high frequency (VHF) radio and asks for the desired altitude or speed. The ATC datalink system (also referred to herein as a CPDLC system) permits the pilot make the request for the desired altitude or speed via a datalink. The air traffic controller responds to the message containing the speed or altitude request via datalink.

Some downlink request messages receive a negative response message, such as a CPDLC uplink message UNABLE message, from the controller. The negative response message (also referred to herein as a "negative uplink response message") is uplinked to the pilot, who reads the uplink message of UNABLE. For example, the air traffic controller sends an UNABLE or NEGATIVE message when air traffic in the vicinity of the aircraft would endanger the aircraft if the aircraft accelerated (or decelerated) to the requested speed or if the aircraft moved to the requested altitude. If the controller responds UNABLE, then the pilot may enquire "When can we expect . . . ".

Currently, if the pilot wants to respond to the UNABLE message that is received from the controller, the pilot searches a message log for the downlink request message to which the UNABLE is responsive. After the pilot finds the associated downlink request message in the message log, the pilot navigates through the air traffic control (ATC) menu screens, and composes the "when can we expect . . . " message by filling in the data to match the original downlink request message, and sends the "When can we expect . . . " message. This process requires considerable "head-down time" during which the pilot is looking down at the display, which shows the CPDLC HMI screens, and is unable to focus on other aspects of flying the aircraft. If there is operational urgency in the message being sent, this head-down time adds time to the processing of the message and delays an urgently required action.

SUMMARY

The present application relates to a system to reduce head-down time for a flight crew member. The system includes a functional module that includes a set of screens used to receive and send controller pilot data link communications (CPDLC) messages between an aircraft and a ground-based system; a message composition screen communicatively coupled to the functional module; and a shortcut interface communicatively coupled to the functional module. A shortcut prompt is displayed when one of: a response timer expires; or a negative uplink response message is received responsive to a previously-sent downlink request message. An implementation of the shortcut interface generates a "when can we expect . . . " message related to the previously-sent downlink request message.

DRAWINGS

In accordance with common practice, the various described features are not drawn to scale but are drawn to emphasize features relevant to the present invention. Like reference characters denote like elements throughout figures and text.

DETAILED DESCRIPTION

The process described herein provides a system and method to reduce the head-down time for responding to a negative response (or a lack of response) to a downlink request message previously sent from an aircraft. With reduced head-down time, the "when can we expect . . . " message is sent to the ground control more quickly after receipt of a negative uplink response or after receiving no response in a preselected time. The process described herein also improves accuracy of the "when can we expect . . . " message since the flight crew member (such as a pilot or co-pilot) is not required to type duplicate data into the "when can we expect . . . " message.

The controller pilot data link communications (CPDLC) includes a data dictionary of predefined message elements that the flight crew member and the controller use to compose messages to send. There are several categories of message elements: requests (e.g., request speed 240 kts); reports (e.g., maintaining speed 230 kts); and responses (e.g., WILCO, UNABLE, AFFIRM, NEGATIVE).

Received negative uplink response messages, such as an UNABLE or NEGATIVE uplink message, are monitored. When the avionics receives an UNABLE uplink message in response to a downlink request message, the received negative message is displayed for viewing by the flight crew member. If there is a "when can we expect . . . " message related to the downlink request message, a shortcut prompt is displayed for the flight crew member. An implementation of a shortcut interface, responsive to viewing the shortcut prompt, triggers a processor to retrieve data in the associated downlink message that prompted the negative response from the air traffic controller. Once retrieved, the data from downlink message that prompted the negative response is input into a related "when can we expect . . . " message to be downlinked to the air traffic controller. For example, if a "request altitude 2,500 ft" downlink request message receives an uplinked UNABLE response, an implementation of a shortcut interface triggers the processor to generate a "when can we expect altitude 2,500 ft?" message for display and review by the pilot. The pilot verifies the data (e.g., the value 2,500 ft) in the "when can we expect altitude 2,500 ft?" message is correct and sends the downlink "when can we expect altitude 2,500 ft?" message after verification. In this manner, the pilot is not required to navigate through the display menu in the CPDLC HMI to a screen for composing "when can we . . . " and then fill in the data. Thus, the pilot requires less head-down time to create the "when can we expect . . . " downlink message. The terms "pilot" and "flight crew member" are used interchangeably herein. The flight crew member can also include a co-pilot of the aircraft.

Figure 1:
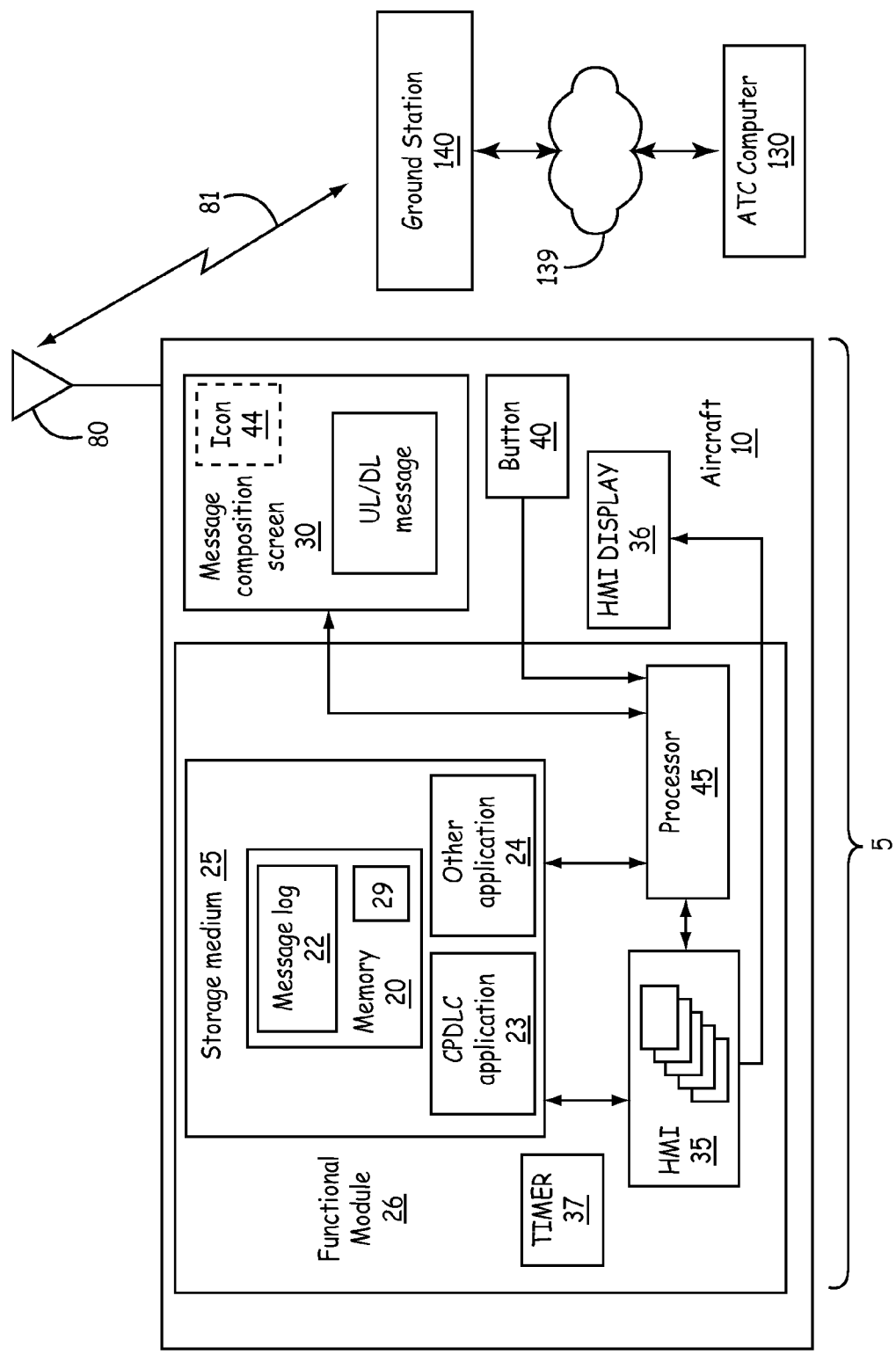
FIG. 1 shows an embodiment of a system to reduce head-down time for a flight crew by automatically displaying a "when can we expect . . . " message in accordance with the present invention.

FIG. 1 shows a system 5 used to reduce head-down time for a flight crew by displaying a "when can we expect . . . " message related to a previously-sent downlink request message in accordance with the present invention. The "previously-sent downlink request message" is also referred to herein as a "previously-sent downlink message." System 5 includes a functional module 26, a CPDLC HMI display 36, a message composition screen 30, and a shortcut interface 40 and/or 44. The functional module 26 includes a CPDLC HMI 35, a processor 45, a response timer 37, and storage medium 25.

The CPDLC HMI 35 includes a set of screens used by members of an aircraft flight crew to receive and send CPDLC messages for viewing on the CPDLC HMI display 36. Exemplary CPDLC HMI includes an air traffic controller (ATC) HMI. In one implementation of this embodiment, CPDLC messages are exchanged over the aeronautical telecommunications network (ATN) and displayed on the CPDLC HMI display 36. In another implementation of this embodiment, future air navigation system (FANS) CPDLC messages are exchanged over an ACARS network and displayed on the CPDLC HMI display 36.

In one implementation of this embodiment, the CPDLC HMI display 36 is a multifunction control display unit (MCDU). In another implementation of this embodiment, the CPDLC HMI display 36 is a multi-function display (MFD).

The response timer 37 is started when a message is down-linked from the aircraft 10. If there is no response to the downlink request message within a preselected time, the response timer 37 expires. When the preselected response time has elapsed since sending the downlink request message, the downlink request message becomes an expired downlink request message, and an indication that the response time has expired is sent to the flight crew member. In an exemplary case, the preselected response time is 2 minutes. In one implementation of this embodiment, when the timer 37 expires, the pilot is given the option to re-send the original downlink request message.

The storage medium 25 includes the memory 20 and software executable by the processor 45 to implement the process described herein. The software includes at least one controller pilot data link communications (CPDLC) application 23 as well as other applications 24. The message log 22 is stored in a memory 20. The message log 22 shows a pilot the received uplink (UL) messages and the downlink (DL) messages sent.

The memory 20 also includes a look-up table 29 or software to relate a plurality of "when can we expect . . . " messages with downlink request messages. In one implementation of this embodiment, the message composition screen 30 is a CPDLC message composition screen 30.

The shortcut interface 40 and/or 44 is used to retrieve the downlink request message associated with the received negative response message. In one implementation of this embodiment, the shortcut interface is a button 40. In another implementation of this embodiment, the shortcut interface is an icon 44 displayed on the CPDLC HMI display 36. In yet another implementation of this embodiment, both the button 40 and the icon 44 are available to the pilot.

In one implementation of this embodiment, the shortcut prompt is a displayed message instructing the flight crew member to implement the shortcut interface to display a "when can we expect . . . " message related to the prior downlink message. In this case, if the shortcut interface is an icon shown on a display, the flight crew member implements the shortcut interface by touching the icon. Likewise, if the shortcut interface is a button, the flight crew member implements the shortcut interface by pressing the button. If the flight crew member touches the icon or presses the button, the "when can we expect . . . " message is displayed to the flight crew member.

In another implementation of this embodiment, the shortcut prompt is a side-link type message displayed to the flight crew member. In an exemplary case, the side-link type message is a COMM alert message. As defined herein, a sidelink or COMM alert message is a message in the message log that looks like an uplink message but is generated by the system. In this case, the shortcut interface is the reply button used to send the affirmative to the side-link type message. The flight crew member implements the shortcut interface by sending a positive reply to the side-link type message. If the flight crew member responds in the affirmative to this side-link type message, the "when can we expect . . . " message is displayed to the flight crew member.

The functional module 26 can be one of a communication management unit (CMU), a communication management function (CMF), a flight management computer (FMC), a flight management function (FMF), an electronic flight bag (EFB), other avionics modules (i.e., another type of avionics module), or a future developed functional module 26 for use with avionics.

An antenna 80 external to the aircraft 10 is used to communicatively couple the aircraft 10 to a ground station 140 via the wireless communication link 81. The ground station 140 is communicatively coupled via a ground network 139 to an air traffic controller (ATC) computer 130 referred to herein as air traffic controller (ATC) computer 130. The ground station 140, the ground network 139 and the air traffic controller (ATC) computer 130 together form a ground-based system.

The processor 45 executes software (CPDLC application 23 and other applications 24) and/or firmware that causes the processor 45 to perform at least some of the processing described here as being performed by the system to reduce head-down time. At least a portion of such software 23 and 24 and/or firmware executed by the processor 45 and any related data structures are stored in storage medium 25 during execution of the software. Memory 20 includes any suitable memory now known or later developed such as, for example, random access memory (RAM), read only memory (ROM), and/or registers within the processor 45. In one implementation, the processor 45 includes a microprocessor or microcontroller. Moreover, although the processor 45 and memory 20 are shown as separate elements in FIG. 1, in one implementation, the processor 45 and memory 20 are implemented in a single device (for example, a single integrated-circuit device). The software 23 and 24 and/or firmware executed by the processor 45 includes a plurality of program instructions that are stored or otherwise embodied on a storage medium 12 from which at least a portion of such program instructions are read for execution by the processor 45. In one implementation, the processor 45 includes processor support chips and/or system support chips such as application-specific integrated circuits (ASICs).

Figure 2:
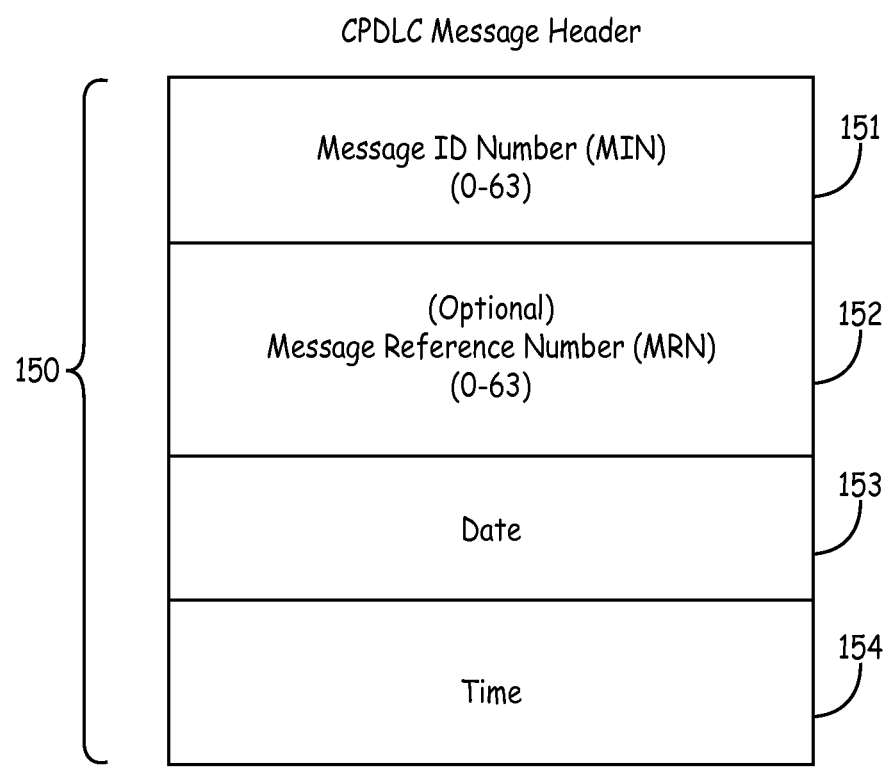
FIG. 2 shows an embodiment of a CPDLC message header.

FIG. 2 shows an embodiment of a CPDLC message header 150. In this exemplary header, the first field 151 of the CPDLC message header 150 includes information indicative of the message identification number (MIN), which includes numbers 0-63 and information indicative of the message reference number (MRN), which also includes numbers 0-63. Every CPDLC message 160 includes a MIN in the header 150. If a CPDLC message is generated responsive to a previously received CPDLC message, then that newly generated CPDLC message includes a MRN that has the same value as the MIN of the associated received CPDLC message. In embodiments, the message is formatted in other ways that are able to provide information indicative of a MIN and that are also able to provide information indicative of the MRN. In order to facilitate description of the use of the MIN and MRN, the following discussion references the exemplary CPDLC message header 150 of FIG. 2.

Figure 3:
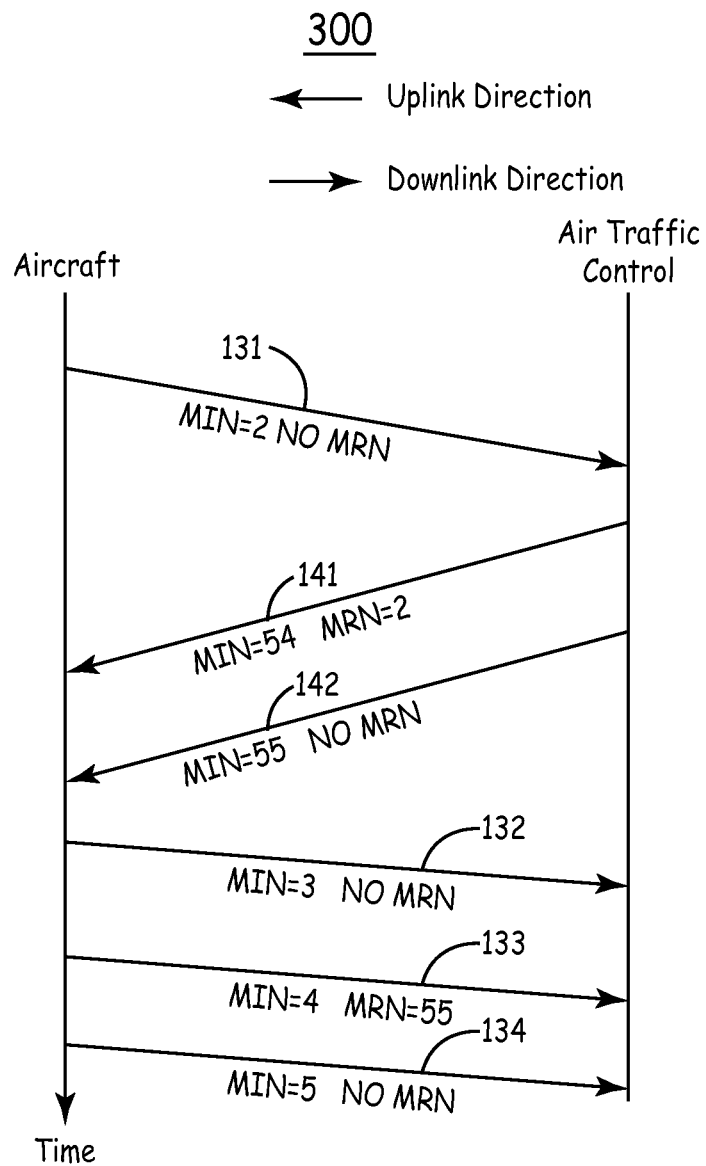
FIG. 3 shows an exemplary flow diagram of downlink and uplink messages.

FIG. 3 shows an exemplary flow diagram 300 of downlink and uplink messages. The downlink messages and the uplink messages referred to herein are CPDLC messages 160 having message headers 150 formatted as shown in FIG. 2. The first downlink message 131 (also referred to herein as "downlink request message 131") has a MIN of 2 and no MRN. The first uplink message 141 is responsive to the first downlink message 131 and has a MIN of 54 and a MRN of 2. The MRN of 2 in the first uplink message 141 (also referred to herein as "negative uplink response message 141") indicates that this message is responsive to the first downlink message 131. A second uplink message 142 has a MIN of 55 and no MRN. Thus, the second uplink message 142 is not related to any other message. A second downlink message 132 has a MIN of 3 and no MRN. Thus, the second downlink message 132 is not related to any other message. A third downlink message 133 has a MIN of 4 and a MRN of 55, which indicates that the third downlink message 133 is responsive to the second uplink message 142. A fourth downlink message 134 has a MIN of 5 and no MRN. The fourth downlink message 134 is also referred to herein as "when can we expect . . ." message and does not include the MRN of the negative uplink response message 141 since the dialog was closed (from the system perspective) when the negative uplink response message 141 was sent. In one implementation of this embodiment, the fourth downlink message 134 includes a MRN that is the MIN (54) of the negative uplink response message 141.

Figure 4:
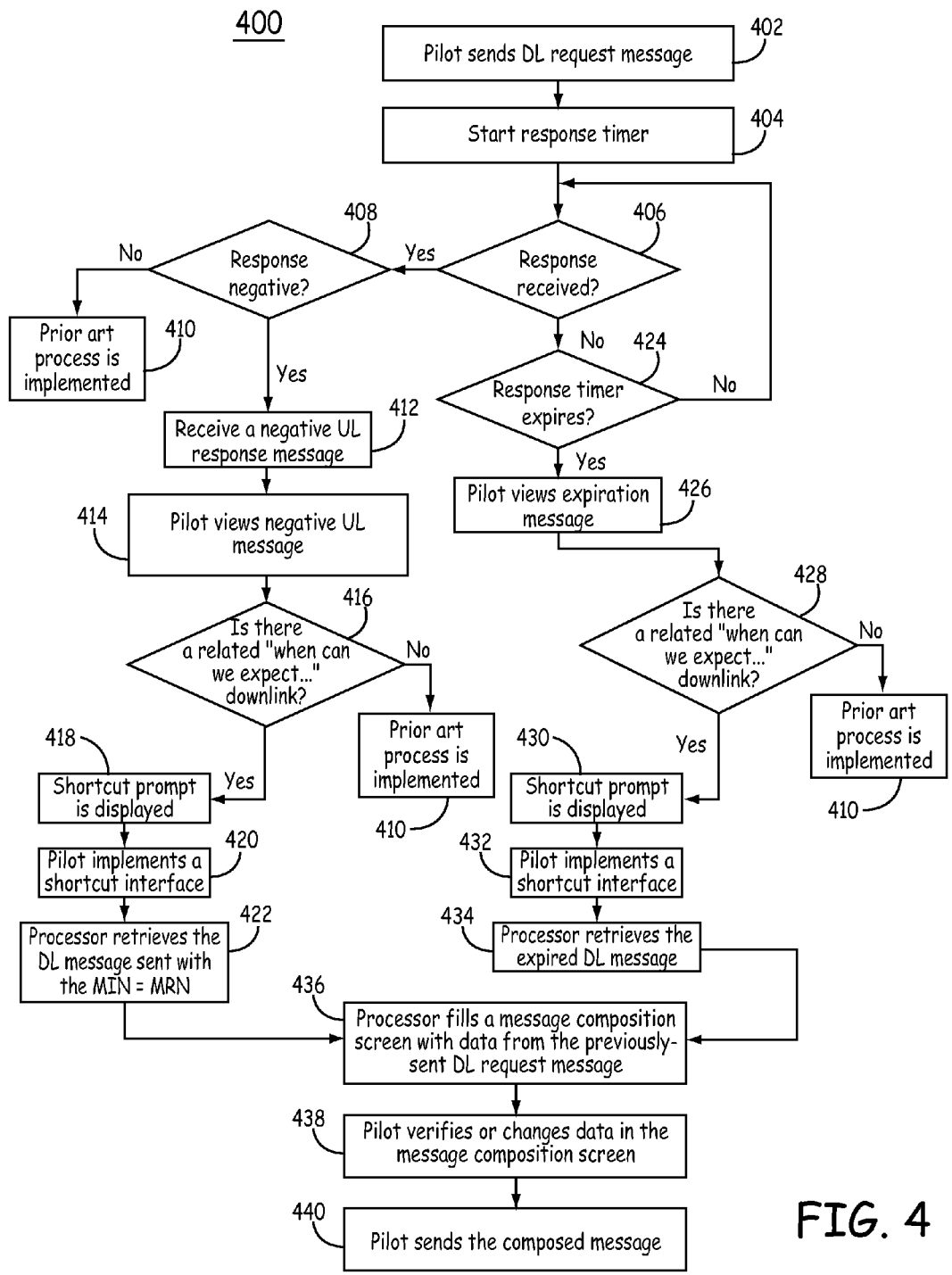
FIG. 4 is a flow diagram of an embodiment of a method to reduce head-down time for a flight crew by automatically displaying a "when can we expect . . . " message related to a previously-sent downlink request message in accordance with the present invention.

FIG. 4 is a flow diagram of an embodiment of a method 400 to reduce head-down time for a flight crew by automatically displaying a "when can we expect . . ." message related to a previously-sent downlink request message in accordance with the present invention. The method 400 is described with reference to the system 5 shown in FIG. 1 and flow diagram 300 of FIG. 3 although it is to be understood that method 400 can be implemented using other embodiments of systems, as is understandable by one skilled in the art who reads this document.

The pilot of aircraft 10 sends a downlink message, such as downlink request message 131, to the ATC 130 via antenna 80, the communication link 81, and ground network 139 (block 402). A response timer 37 is started when the downlink request message is sent (block 404). Responsive to receiving the downlink request message 131 at ATC 130, an uplink response message 141 is sent from the ATC 130 to the aircraft 10 via the ground network 139, the communication link 81, and the antenna 80. Responses are typically received at aircraft 10 within a preselected response time. The response timer 37 in the functional module 26 expires if there is no response within the preselected response time (blocks 406 and 424).

If a response is received at the processor 45 within the preselected response time, the processor 45 determines if the response is negative (blocks 406 and 408). If there is a positive determination at both blocks 406 and 408, the flow proceeds to block 412 and the functional module 26 receives the negative uplink response message 141. In one implementation of this embodiment, the uplink message 141 is a negative uplink response message sent from the ATC 130 to indicate that the request in the last-sent downlink request message 131 is denied. In another implementation of this embodiment, the negative uplink response message sent from the ATC 130 to indicate that the request in a previously-sent downlink request message (not necessarily the last-sent downlink request message) is denied. In this case, the MIN in the related previously-sent downlink request message is the MRN of the uplink message 141. In yet another implementation of this embodiment, the negative uplink response message is a CPDLC UNABLE message. In yet another implementation of this embodiment, the negative uplink response message is a CPDLC NEGATIVE message.

If there is a positive determination at block 406 and a negative determination at block 408, the flow proceeds to block 410 and a prior art process is implemented. The prior art process for responding to a positive uplink response message remains unchanged.

When the functional module 26 receives the negative uplink response message 141 (block 412), the negative uplink response message 141 is stored in the message log 22. An alert is used to notify the pilot that a message has been received. The alert can be visual (e.g., a light) or aural (e.g., a chime) or both.

The flight crew member goes to the message log 22 to view the negative uplink response message 141 (block 414). The processor 45 determines if the downlink request message 131 is related to one of a plurality of "when can we expect . . ." messages (block 416). For example, if the downlink request message 131 was a "request altitude . . ." or a "request speed . . ." message there is a related "when can we expect altitude . . ." and a "when can we expect speed . . ." message in the CPDLC HMI 35. In one implementation of this embodiment, the processor 45 uses the MRN in the second field 152 of the CPDLC message header 150 of the negative uplink response message 141 (e.g., MRN=2) to find the associated downlink request message 131. Once the downlink request message 131 is found, the processor 45 checks the look-up table 29 in the memory 20 to determine if the downlink request message 131 has a related "when can we expect . . ." message.

If there is no related "when can we expect . . ." message associated with the negative uplink response message 141, the flow proceeds from block 416 to block 410 and a prior art process is implemented. The prior art process of responding to a negative uplink response message requires more head-down time for the pilot than the process described below with reference to blocks 418-422 and 430-440).

If there is a related "when can we expect . . ." message associated with the prior downlink message referenced by the negative uplink response message 141, the flow proceeds from block 416 to block 418. A shortcut prompt is displayed to indicate that there is a related "when can we expect . . ." message associated with the prior downlink message referenced by the negative uplink response message 141 (block 418). In one implementation of this embodiment, the shortcut prompt is a message on the message display screen 36 to press button 40 to display a "when can we expect . . ." message related to the prior downlink message referenced by the negative uplink response message 141. In another implementation of this embodiment, the shortcut prompt is the appearance of an icon 44 which is pressed by the pilot to display a "when can we expect . . ." message related to the prior downlink message referenced by the negative uplink response message 141. In yet another implementation of this embodiment, the shortcut prompt is a visual and/or aural alert for the pilot to press button 40 to display a "when can we expect . . . " message related to the prior downlink message referenced by the negative uplink response message 141. In yet another implementation of this embodiment, the shortcut prompt is a COMM alert message (separate sidelink).

The pilot implements a shortcut interface 40 by pressing the shortcut interface (e.g., the button 40 or the icon 44) to send a prompt to the processor 45 (block 420). In one implementation of this embodiment, the shortcut prompt is implemented by the push of the shortcut interface 40. Other methods of prompting an implementation of the shortcut prompt are possible. For example, the system 5 can include a microphone and pilot can verbally request an initiation of the shortcut, for example, by saying "SHORTCUT".

The processor 45 retrieves the downlink request message 131 stored in the message log 22 that has a MIN value in the first field 151 that matches the MRN value in the second field 152 in the CPDLC message header 150 of the negative uplink response message 141 (block 422). The flow proceeds to block 436.

The flow from block 406 to block 424 is now described for those embodiments in which no response is received and the response timer 37 has expired (block 424). If the determination at block 406 is negative and block 424 is positive, the flow proceeds to block 426. The flight crew member goes to the message log 22 to view the expired message 141 (expiration message) (block 426). As defined herein, an expired downlink request message is the previously-sent downlink request message for which no response was received prior to the response time expiring.

The processor 45 determines if the expired message 131 is related to one of a plurality of "when can we expect . . . " messages (block 428). If the expired message 131 is not related to one of a plurality of "when can we expect . . . " messages, the flow proceeds to block 410 and the prior art process is implemented. If the expired message 131 is related to one of the plurality of "when can we expect . . . " messages, the flow proceeds to block 430. The shortcut prompt is displayed to indicate that there is a related "when can we expect . . . " message associated with the prior downlink message referenced by the negative uplink response message 141 (block 430). The pilot implements a shortcut interface 40 by pressing the shortcut interface (e.g., the button 40 or the icon 44) to send a prompt to the processor 45 (block 432). The processor 45 retrieves the expired downlink request message 131 stored in the message log 22. The flow proceeds to block 436. In one implementation of this embodiment, the pilot is given the option to resend the original message.

The processor 45 fills the message composition screen 30 with data from the previously-sent downlink request message (block 436). In this manner, the message composition screen 30 shows the "when can we expect . . . " downlink associated with the previously-sent downlink request message 131 with the data that was in the previously-sent downlink request message 131 that was sent at block 402. The data (e.g., requested speed or altitude level) in the previously-sent downlink request message 131 is included in the message shown on the message composition screen 30. Since the pilot does not have to type the data into the message composition screen 30, there is no possibility of the pilot typing in the wrong number at this point in the process.

The pilot reviews and either verifies (accepts) or changes the data from the previously-sent downlink request message 131 that is displayed on the message composition screen 30 for the associated "when can we expect . . . " (block 438). At this point, the pilot has the option of 1) changing the data in the "when can we expect . . . " message to be sent; 2) sending the "when can we expect . . . " message with the original data from the previously sent downlink request message; or 3) not sending the message to ask "when can we expect . . . ". For example, the pilot may want to request a move to an altitude of 3,000 ft if a negative uplink response message received for a request to move to an altitude of 2,500 ft.

The pilot sends the composed message (block 440). The pilot provides a send-prompt (e.g., pushes a button) to send the "when can we expect . . . " message displayed on the message composition screen 30 as downlink request message 134.

In this manner, system 5 reduces the head-down time for responding to a negative response (or a lack of response) to a downlink request message previously sent from an aircraft 10. The pilot did not need to search for the previously-sent downlink request message and then navigate through air traffic control (ATC) menu screens to select the "when can we expect . . . " message screen, and then fill in the data for "when can we expect . . . " message to send the downlink request message 134, since this was automatically done by the processor 45 when the pilot implemented the shortcut. If the pilot decides not to send the "when can we expect . . . " message, the pilot does not provide a send-prompt at block 440. If the pilot decides to change the data before sending the "when can we expect . . . " message, the pilot enters the new data on the message composition screen 30 in place of the original data, and then provides the send-prompt to send the modified version of the message.

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system to reduce head-down time for a flight crew member, the system comprising:
   a functional module including a set of screens used to receive and send controller pilot data link communications (CPDLC) messages between an aircraft and a ground-based system;
   a message composition screen communicatively coupled to the functional module; and
   a shortcut interface communicatively coupled to the functional module, wherein a shortcut prompt is displayed by a processor in the functional module responsive to a negative uplink response message being received responsive to a previously-sent downlink request message; and
   wherein a CPDLC "when can we expect . . . " message related to the previously-sent downlink request message is generated by the processor in the functional module responsive to the shortcut interface being implemented.

2. The system of claim 1, wherein the shortcut prompt is a side-link type message displayed to the flight crew member, and wherein the shortcut interface is a reply button used to send an affirmative response to the side-link type message.

3. The system of claim 1, wherein the shortcut prompt is a displayed message indicating to the flight crew member to implement the shortcut interface to display the "when can we expect . . . " message related to the prior downlink message.

4. The system of claim 1, wherein the negative uplink response message responsive to the previously-sent downlink request message includes:
  a message header including information indicative of a message identification number and information indicative of a message reference number, and wherein the message reference number of the "when can we expect . . ." message is the message identification number of the negative uplink response.

5. The system of claim 1, wherein the functional module further includes:
  the processor; and
  a storage medium including a controller pilot data link communications (CPDLC) application executable by the processor.

6. The system of claim 1, wherein the functional module is one of a communication management unit, a communication management function, a flight management computer, a flight management function, an electronic flight bag, and an avionics module.

7. The system of claim 1, wherein the negative uplink response message is one of a controller pilot data link communications UNABLE message, and a controller pilot data link communications NEGATIVE message.

8. The system of claim 1, wherein the functional module further includes:
  the processor; and
  a message log in a memory, wherein, responsive to one of:
    receiving the negative uplink response message, and
    the response timer expiring for the previously-sent downlink request message, and
    responsive to receiving an indication of implementation of the shortcut interface, the processor retrieves the previously-sent downlink request message from the message log and fills the message composition screen with data from the previously-sent downlink request message.

9. The system of claim 1, wherein the system is an air traffic control datalink system.

10. A method to reduce head-down time for a flight crew member, the method comprising:
  receiving
    a negative uplink response message responsive to a downlink request message at a processor;
  displaying a shortcut prompt on a display if a CPDLC "when can we expect . . ." message is related to the downlink request message; and
  filling a message composition screen with data from a previously-sent downlink request message by the processor responsive to an implementation of a shortcut interface triggered by the displaying of the shortcut prompt.

11. The method of claim 10, wherein displaying the shortcut prompt comprises displaying a side-link type message.

12. The method of claim 10, wherein displaying the shortcut prompt comprises displaying a message to implement a shortcut interface to display the "when can we expect . . ." message related to the previously-sent downlink request message.

13. The method of claim 10, further comprising determining if a message header of the negative uplink response message includes a message reference number.

14. The method of claim 13, wherein, if the message header of the negative uplink response message includes the message reference number, the method further comprises:
  matching the message reference number with a message identification number of one of previously-sent downlink request messages; and
  determining if one of a plurality of "when can we expect . . ." messages is related to the previously-sent downlink request message,
  wherein, if one of the plurality of "when can we expect . . ." messages is related to the previously-sent downlink request message, filling the message composition screen with data from the previously-sent downlink request message comprises filling the message composition screen with data from the previously-sent downlink request message having the matching message identification number.

15. The method of claim 13, wherein, if the message header of the negative uplink response message does not include the message reference number, the method further comprises:
  retrieving a last-sent downlink request message; and
  determining if one of a plurality of "when can we expect . . ." messages is related to the last-sent downlink request message.

16. The method of claim 15, wherein, based on a determination that one of the plurality of "when can we expect . . ." messages is related to the last-sent downlink request message, the method further comprises:
  filling the message composition screen with data from the last-sent downlink request message.

17. The method of claim 10, further comprising:
  receiving at the processor an indication that a response time has expired for the downlink request message prior to receiving the negative uplink response message responsive to the downlink request message, wherein, responsive to the response timer being expired, the shortcut prompt is displayed on the display if the CPDLC "when can we expect . . ." message is related to the downlink request message, wherein filling the message composition screen with data from the previously-sent downlink request message comprises filling the message composition screen with data from an expired downlink request message.

18. The method of claim 10, further comprising:
  upon receiving a send-prompt, sending the "when can we expect . . ." message related to one of:
    the previously-sent downlink request message having a message identification number that matches a message reference number of the negative uplink response message; and
    a last-sent downlink request message.

19. The method of claim 10, further comprising:
  replacing data in the message composition screen filled with data from the previously-sent downlink request message based on input from the flight crew member; and
  upon receiving a send-prompt, sending a modified "when can we expect . . ." message related to one of:
    the previously-sent downlink request message having a message identification number that matches a message reference number of the negative uplink response message; and
    a last-sent downlink request message.

20. A system to reduce head-down time for a flight crew member, the system comprising:
  a functional module including:
    a set of screens used to receive and send controller pilot data link communications (CPDLC) messages between an aircraft and a ground-based system,
    at least one CPDLC application;

a processor to execute the at least one CPDLC application;

a message composition screen communicatively coupled to the functional module; and a shortcut interface communicatively coupled to the functional module, wherein, if a negative uplink response message is received responsive to a previously-sent downlink request message, and if one of a plurality of CPDLC "when can we expect . . . " messages is related to the previously-sent downlink request message, then the processor in the functional module displays a shortcut prompt, and wherein, if the flight crew member implements the shortcut interface responsive to the shortcut prompt being displayed, the message composition screen is filled by the processor with data from the previously-sent downlink request message.

* * * * *